United States Patent [19]

Slonim

[11] 4,340,821

[45] Jul. 20, 1982

[54] APPARATUS FOR HARNESSING WAVE ENERGY

[76] Inventor: David M. Slonim, 1869 P.O.B., 3, Ourania St., Nicosia, Cyprus

[21] Appl. No.: 161,147

[22] Filed: Jun. 19, 1980

[51] Int. Cl.³ .............................................. F03B 13/12
[52] U.S. Cl. ...................................... 290/53; 60/495
[58] Field of Search ............... 47/330, 331, 332, 333, 47/334; 416/117; 60/398, 495, 497, 499, 500, 501; 290/53, 42; 440/9

[56] References Cited

U.S. PATENT DOCUMENTS

| | | | |
|---|---|---|---|
| 616,468 | 12/1898 | Jones | 417/330 |
| 855,258 | 5/1907 | Neal | 417/332 |
| 967,437 | 8/1910 | Reynolds | 60/398 |
| 988,508 | 4/1911 | Reynolds | 417/330 |
| 997,731 | 7/1911 | Ayers | 60/501 |
| 1,172,737 | 2/1916 | Roach | 440/9 |
| 1,184,362 | 5/1916 | Lindquist | 60/501 |
| 1,448,029 | 3/1923 | Larry et al. | 290/42 |
| 1,502,511 | 7/1924 | Marvin | 60/501 |
| 1,682,176 | 8/1928 | Hegenbarth | 440/9 |
| 3,231,749 | 4/1963 | Hinck | 290/53 |
| 4,045,148 | 8/1977 | Morin | 416/117 |
| 4,198,821 | 4/1980 | Moody | 290/53 |

Primary Examiner—J. D. Miller
Assistant Examiner—D. L. Rebsch
Attorney, Agent, or Firm—Young & Thompson

[57] ABSTRACT

Apparatus for harnessing wave energy comprises a buoyant support structure with various pumps to be operated by the wave action or the reaction from the wave action. One type of pump is actuated by a disc that depends to a depth below the apparatus, and that is hollow and air-filled so as to have a buoyancy close to zero, and that responds to the wave action by actuating a piston within an upright cylinder. Vertical flaps, some of which depend downwardly and others of which extend upwardly, respond to the horizontal wave action to actuate further pumps. A third form of utilization of the wave energy is by pendulums mounted for horizontal swinging movement about vertical axes, whose inertia upon swinging movement of the apparatus, actuates further pumps. The wave energy can be transmitted to shore either as a fluid (air or water) pumped to shore by the pumps, or as electrical energy through an electrical cable, from a generator on the apparatus. In either event, the cable or conduit extends down along the anchor chain, and then to shore.

2 Claims, 10 Drawing Figures

APPARATUS FOR HARNESSING WAVE ENERGY

This invention relates to apparatus for harnessing wave energy.

With the present energy shortage, it has become necessary to exploit the vast untapped quantity of energy available in the sea.

According to one aspect of the present invention, there is provided apparatus for harnessing wave energy, comprising a floatable support structure, pump means supported by the support structure, means responsive to waves for operating the pump means, and means for conveying the fluid pumped by the pump means to an on-shore location, wherein the wave-responsive means includes at least one buoyant flap mounted on the support structure for pivotable movement about a horizontal or substantially horizontal axis spaced, in use, below the surface of the water by such a distance that the flap will be generally vertically upstanding in the water.

According to a further aspect of the invention, there is provided apparatus for harnessing wave energy, comprising a floatable support structure, pump means supported by the support structure, means responsive to waves for operating the pump means and means for conveying the fluid pumped by the pump means to an on-shore location, wherein the wave-responsive means includes one or more pendulums mounted on the support structure for to and fro movement in a generally horizontal plane.

According to a yet further aspect of the invention, there is provided apparatus for harnessing wave energy, comprising a floatable support structure, pump means supported by the support structure, means responsive to waves for operating the pump means, and means for conveying the fluid pumped by the pump means to an on-shore location, wherein the wave-responsive means includes a member resistant to vertical movement in water and connected to the lower end of a depending elongate member which is connected at its upper end to the pump means on the support structure and which extends, in use, beneath the water surface so that, in use, as the apparatus rises and falls under the influence of waves, the piston will undergo reciprocatory movement.

The invention will now be more particularly described, by way of example, with reference to the accompanying drawings, in which.

Figure 1:
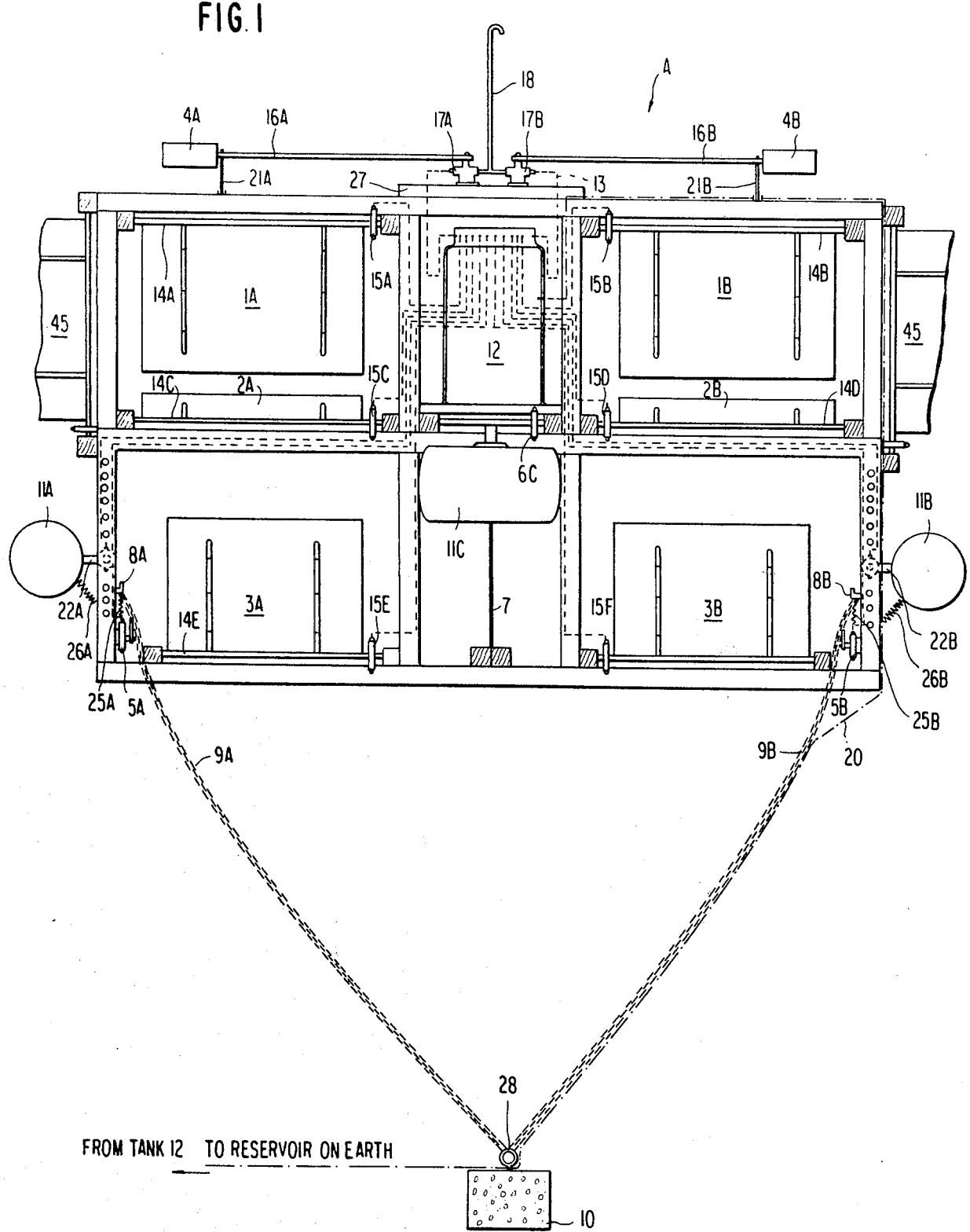
FIG. 1 is a sectional side view of one embodiment of apparatus according to the present invention.

Referring to FIG. 1 there is shown therein an apparatus A for harnessing wave energy. The apparatus includes a floating support structure constructed of wood and/or from hollow tubes, each securely sealed and made completely airtight so as to make the tubes buoyant and to ensure that the apparatus remains afloat. The apparatus has flaps 1A, 1B, 2A, 2B, 3A and 3B made of wood and/or of a strong and non-corrosive material.

Flaps 1A ad 1B are made of a material which is heavier than water, and when not influenced by movement of the sea, they depend vertically from horizontal axles 14A and 14B respectively. Flaps 2A, 2B, 3A and 3B are made of a material less dense than water, or of a material which is air-filled, causing them to be buoyant. These flaps are fixed to horizontal axles 14C, 14D, 14E and 14F respectively.

The axles 14A, 14B, 14C, 14D, 14E and 14F are in turn each coupled at one end to pumps 15A, 15B, 15C, 15D, 15E and 15F respectively. The movement of the sea swings the flaps which in turn operate a respective pump. The pumps pump water or air to a central tank 12. Each pump is connected by a separate pipe 19 (shown in broken lines) to the central tank 12.

The vertical flaps 1A and 1B are moved reciprocably by large above-surface waves. The flaps 2A and 2B are generally horizontal, and they are moved by the small above-surface waves. The flaps 3A and 3B are connected to the axles 14E and 14F at the base of the flaps. These flaps when submerged in water are generally vertically upstanding. These flaps 3A and 3B are moved by the movement of water below the surface of the sea.

As a result of the combined movement of the large above-surface waves, the small above-surface waves and water movement below the sea surface, the apparatus, which is semisubmerged, is in constant motion.

Figure 2:
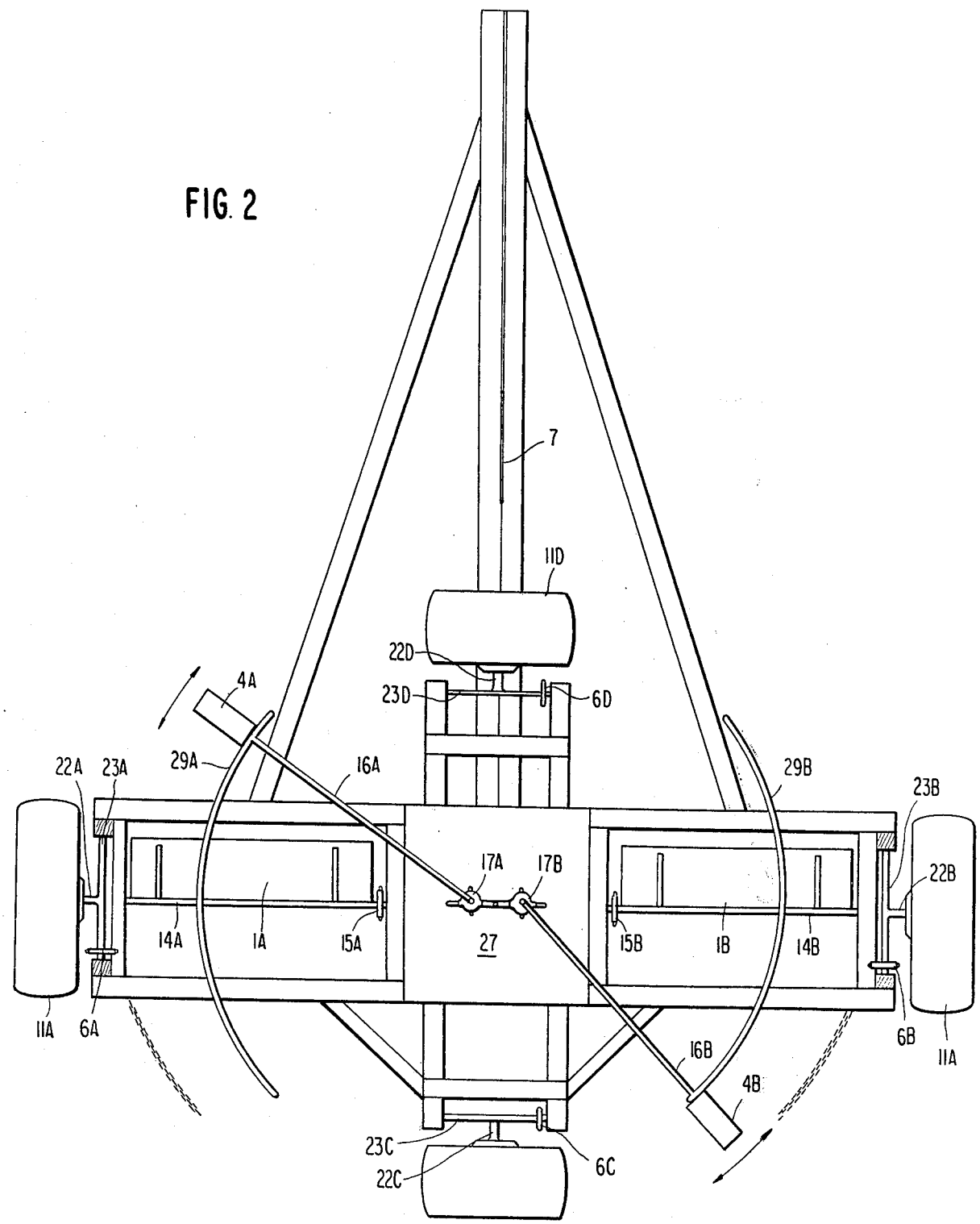
FIG. 2 is a plan view of the apparatus as shown in FIG. 1, with the omission of flaps 45.

Two pendulums which comprise respective weights 4A and 4B are supported by a respective leg 21A, 21B, which is supported on a respective arcuately extending rail 29A, 29B on the upper surface of the apparatus A (see FIG. 2). Alternatively, the legs 21A, 21B can be omitted. The pendulums can swing on the rails through a radius of up to 90°. Each weight 4A, 4B is coupled to a respective axle 16A, 16B, which operates a respective pump 17A, 17B. The pumps 17A and 17B, which are positioned on a platform 27, pump air or water via connecting pipes 13 to the central tank 12. The constant movement of the sea causes constant movement of the pendulums under the influence of gravitational force.

In the embodiment of FIG. 1, the apparatus is anchored to, for example a concrete block 10 on the sea bed by two chains 9A and 9B. The chains 9A and 9B are secured to the apparatus by two hooks 8A and 8B, and to the concrete block by a swivel hook 28. The swivel hook allows the apparatus to turn in a radius of 180°. Two pumps 5A and 5B are attached between the chains 9A and 9B and the apparatus A. The movement of the water causes the apparatus A to have a reciprocatory motion in the sea. The two pumps 5A and 5B, which are inserted near the upper end of each chain, are operated by this constant reciprocatory motion.

The return movement of the pumps 5A and 5B is activated by springs 25A and 25B near the pumps. Strong pumps are needed because of the reciprocatory motion.

The apparatus is kept afloat by four airtight tanks 11A, 11B, 11C and 11D. Each airtight tank is connected to the apparatus by a bar 22A, 22B, 22C and 22D respectively. When the apparatus is moved by the sea, up and down, the bars 22A, 22B, 22C and 22D move up and down and activate axles 23A, 23B, 23C and 23D. Each of these axles activates a pump 6A, 6B, 6C and 6D respectively. In this way, any movement of the apparatus, whether any one or all of its sides move vertically up and down, will activate one or all of the four pumps 6A, 6B, 6C and 6D.

The apparatus has a flat, vertically aligned rudder or fin 7 (see FIGS. 1 and 2) supported on a horizontally projecting extension of the floating support structure. The rudder is of a suitable size to ensure that the apparatus remains constantly at right angles to the direction of waves and water movement. This ensures that the flaps 1A, 1B, 2A, 2B, 3A and 3B benefit from the maximum impact of the water's movement.

The central tank 12 is served by all the pumps whether they are pumping air or water. A pipe 20 connects the central tank 12 to a land-based reservoir tank. The air or water is transferred from the central tank to the reservoir by the air pressure created in the central tank by all the pumps of the apparatus. This central tank is sealed and half filled with water (when used for pumping water). When the pumps are pumping in sea water, pressure is created which forces the water or air (as the case may be) to the reservoir on the land by means of the connecting pipe 20 from the central tank 12.

The reservoir, if used for storing water, should be raised and of sufficient capacity to support the high pressure required to operate an electric generator, or any other machinery, to be driven by the water pressure. On the other hand, if the reservoir is intended for the storage of air, which is preferable, it would have to be constructed underground, made airtight and be able to withstand the required pressure.

The reservoir for air or water should have a minimum storage capacity of 48 hour supply in order that the fluctuations of energy supply from the sea may be regulated.

The sides of the apparatus are covered with aluminum plates so as to help keep the apparatus at right angles to the waves.

Figure 3:
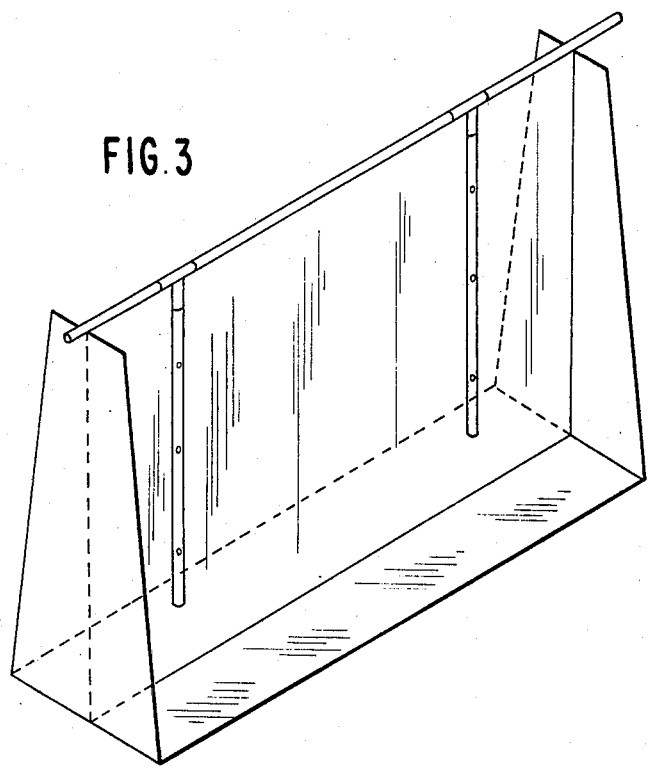
FIG. 3 is a perspective view on an enlarged scale of a flap of the apparatus as shown in FIGS. 1 and 2.
Figure 4A:
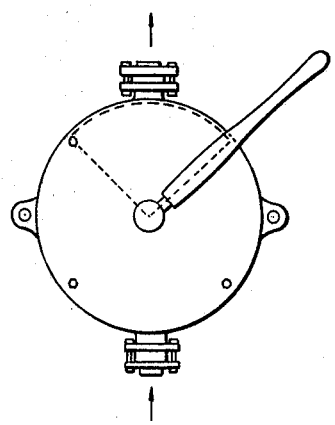
FIGS. 4A and 4B are elevational and partial side views respectively on an enlarged scale of a pump of the apparatus as shown in FIGS. 1 and 2.
Figure 4B:
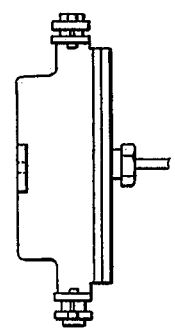

As shown in FIG. 3, the flaps have flanged edges to ensure full impact of waves on the flaps. However, these flanges can be omitted if desired.

As the apparatus may be adopted for either water or air pumping, different kinds of pumps will be used to serve each case. If used for water, the sea water will be pumped by all the pumps from the sea to the central tank 12 and then from it to the reservoir on the land. If used for air, the pumps will pump air from a pipe 18 protruding above the surface of the sea. The air will be pumped into the central tank 12 and from the central tank under air pressure to the land reservoir. When operating by the air system, no water will be required in the central tank. On the other hand, when operating by sea water, the central tank will have to be partly filled with water so as to create the air pressure required to force the water to the reservoir on the land.

All intake pipes for water or air have required filters, and all the outlet pips from the pumps to the central tank have non-return valves.

In order to adjust the level of submergence of the apparatus in the sea, there are adjusting holes on the body of the apparatus near the tanks 11A, 11B, 11C and 11D.

If desired, flaps 45 may be attached to the sides of the apparatus. The flaps 45 are attached to vertical axles. Because the flaps are fixed on one side only, they swing like an ordinary door when the waves move them backward and forward. A spring returns them to a predetermined position after each wave impact.

The flaps are fixed on each side of the apparatus from the top to about the center of the apparatus' body. The lower part of these flaps is on the same level as flaps 2A and 2B, that is, above the sea surface in order to receive the impact of above-surface waves.

The apparatus' width is about five meters, or any other desired size, and the materials of construction, i.e. the wooden planks or the metal tubes, are joined together by bolts and nuts and/or by welding.

Figure 5:
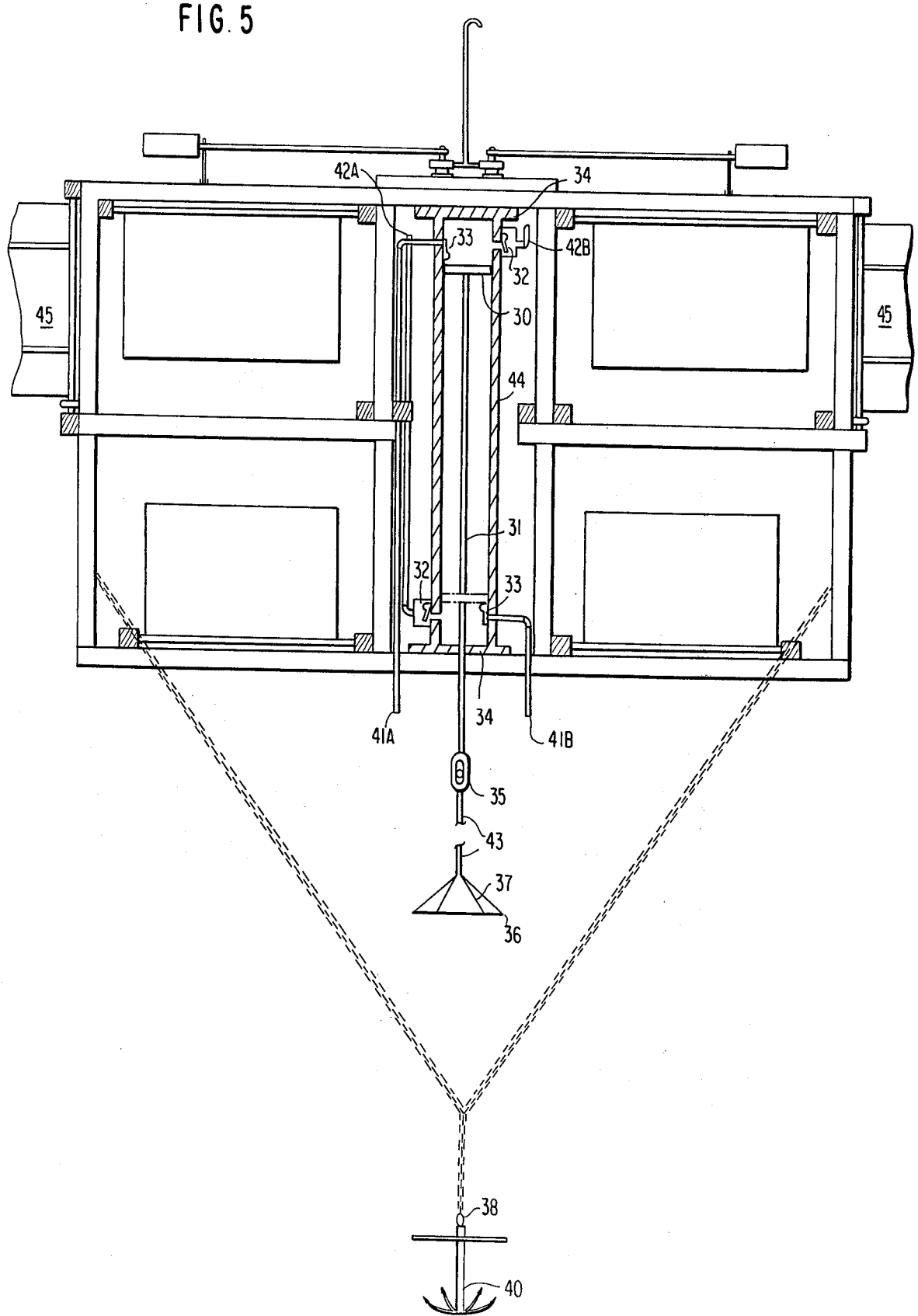
FIG. 5 is a sectional side view of part of a modified apparatus according to the present invention.

Referring now to FIG. 5, the modified apparatus shown therein includes a vertically arranged double action pump 44 mounted at the center of the support structure and connected thereto by flanges 34. The pump 44 has a piston 30 and a piston rod 31 which projects from the lower end of the pump 44. A telescopically extendible/retractable leg 43 is connected at its upper end to the lower end of the piston rod 31 by a universal coupling 35. A member resistant to vertical movement in the water in the form of a hollow, circular disc 36 is connected to the lower end of the leg 43 by four support members 37 and sprung shock absorber means. The length of the leg 43 is adjusted so that the disc 36 is supported above but close to the sea bed—the taller the waves the further the disc 36 should be from the sea bed.

The disc 36 can be filled with a liquid, e.g. water, or a gas, e.g. air, so that it can be heavier or lighter per unit volume than sea water or indeed of the same weight per unit volume as water.

The tank 12, shown in FIG. 1 but not in FIG. 5, is located directly behind the pump 44 of the embodiment of FIG. 5.

The pump 44 has two one-way inlet valves 33 connected to inlet pipes 41A and 41B respectively and two one-way outlet valves 32 connected to outlet pipes 42A and 42B respectively.

In use, as waves lift the apparatus, the resistant to upward movement of the disc 36 submerged in the sea will result in the disc 36 rising more slowly and in turn this will result in downward movement of the piston 30 relative to the body of the pump 44. Similarly, when the apparatus falls, the disc will descend more slowly resulting in upward movement of the piston 30 relative to the body of the pump 44. This continuous up and down movement of the piston 30 caused by waves will operate the double action pump 44.

The diameter of the pump 44 and disc 36 should be dependent upon the height of the waves in which the apparatus will operate, but the total weight of the leg 43 and disc 36 should be such as to keep the horizontal and vertical center of the apparatus level with the surface of the sea.

When operating in shallow water, the disc should contact the sea bed in order to push the piston upward, downward movement of the piston being caused by the weight and/or resistance of the leg 43 and the disc 39 when the waves lift the apparatus.

In this embodiment, the concrete block 10 will be unnecessary as the upward pull of the apparatus will be resisted by the disc 36. Thus, the apparatus of this embodiment can be moored by an anchor 40 connected via a swivel coupler 38 and chains to the supporting structure of the apparatus. In this embodiment, the pumps 5A and 5B will be omitted.

The apparatus of the present invention can also convert ocean wave energy to electricity, by installing an electric generator on the apparatus on the side of pump 44. The compressed air, or water under pressure, instead of being transmitted to shore, will then be immediately fed from tank 12 through the turbine of the generator.

Figure 6A:
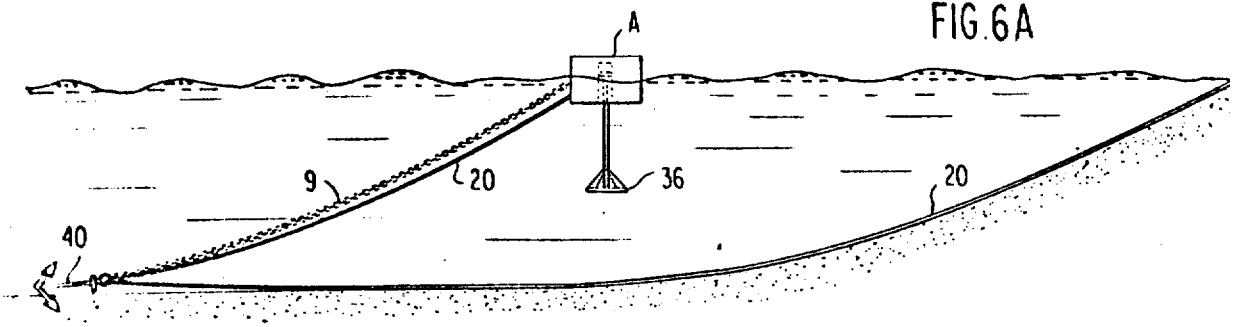
FIGS. 6A and 6B are elevational and plan views, respectively, of a modified form of apparatus.
Figure 6B:
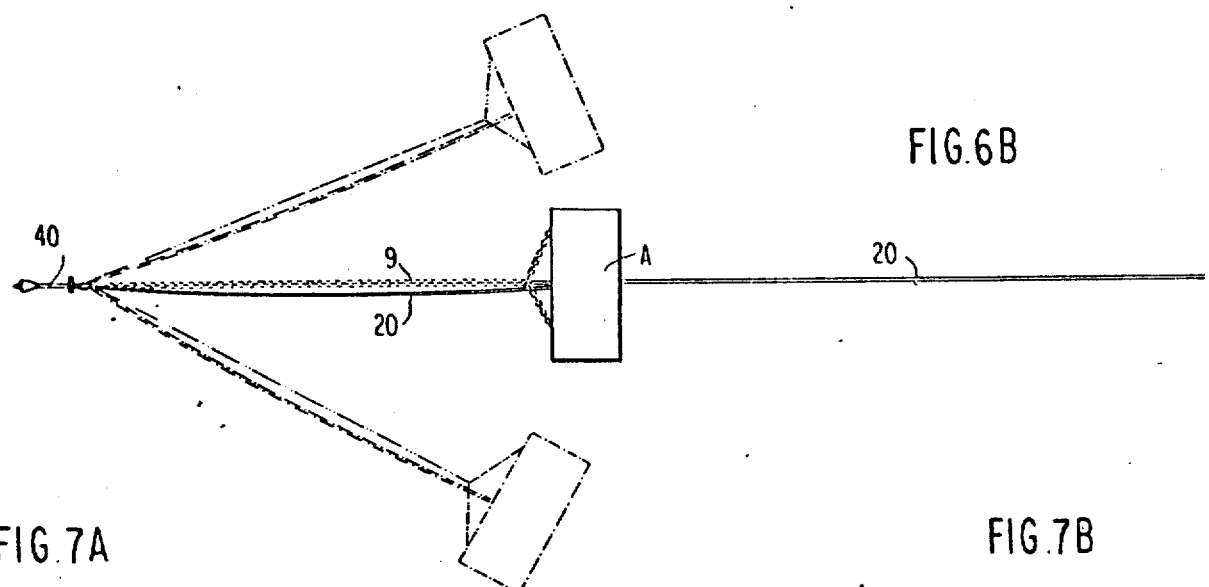

In this case, and in other cases in which the wave energy is directly transformed to electrical energy, the energy will be transmitted by electric cable from the apparatus to the shore. An arrangement for doing this is shown in FIGS. 6A and 6B.

But whether the energy is transmitted by an electric cable, or via a fluid passing through a conduit, it is to be noted that a very important aspect of the present invention is that the electric cable or the conduit transmitting the energy passes from the apparatus to the anchor, parallel to the main chain which connects the apparatus to the anchor, and then from the anchor in a direct line to the shore. Thus, no matter how the apparatus swings or undergoes other motion in the water, relative to the anchor, the chain 9 will protect the electric cable or conduit 20 which runs along it, so that substantially all of the tension will be borne by chain 9 and substantially none by the cable or conduit 20.

The apparatus as seen in FIGS. 1–5 is suitable for medium wave heights; but for high waves which may destroy any outside large moving parts, the apparatus and pump 44 will have to be of a larger size, wherein the diameter of pump 44 may be about 10 meters or more. There will be only the pump 44 and the electric generator in an enclosed circular cylinder, with the circular disc 36 protruding down into the calm water below.

For waves of that magnitude, it will be even better to have only a large-diameter cylinder, closed on top and open at the bottom, floating in the ocean with its open bottom part fixed rigidly to the disc 36 protruding down into the calm water. In this case, the ocean water itself will serve as the piston of the pump, and the compressed air in the cylinder will operate the electric generator, which is fixed on top of it. The electricity generated will be transmitted to the shore as explained above.

Figure 7A:
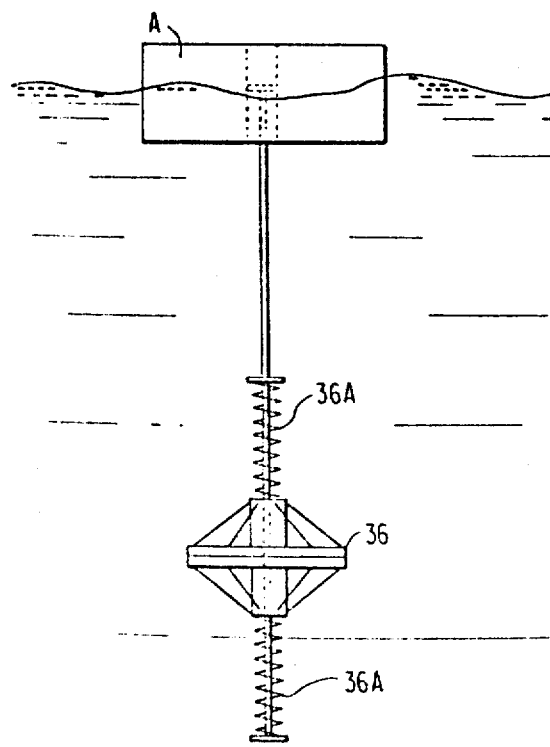
FIGS. 7A and 7B are elevational views of two further embodiments of apparatus according to the present invention.
Figure 7B:
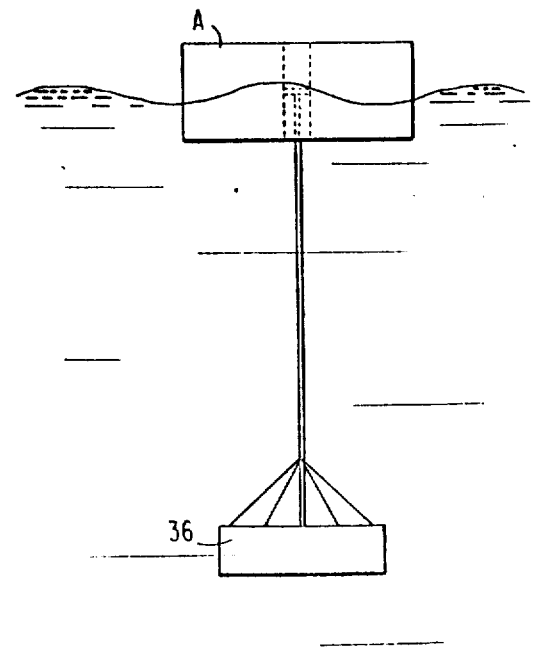

The embodiments shown in FIGS. 7A and 7B are for use in high waves and do not include the pendulums and swinging parts of the preceding embodiments, but only the disc 36, which, in the illustrated embodiments, is filled with air to render it of slight positive buoyancy. In the FIG. 7A embodiment, coil compression springs 36A act as shock absorbers to permit limited movement of disc 36 relative to its associated leg 43.

It will be appreciated that the use of the disc 36 is a very important feature of the present invention and constitutes a breakthrough in the art of converting wave energy to useful energy. Disc 36 has solved the problem of mooring, because no permanent mooring is required, and allows the apparatus to be moved in any direction by the waves.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for harnessing wave energy, comprising a floatable support structure, means anchoring the support structure to a single point on the bottom of a body of water so that wave action will position the structure, pump means supported by the support structure, means responsive to waves for operating the pump means, and means for conveying the wave energy to an on-shore location, the wave responsive means including at least one buoyant flap mounted on the support structure for pivotal movement about a substantially horizontal axis spaced, in use, below the surface of the water by such a distance that the flap will be generally vertically upstanding in the water broadside to the waves in the position of the anchored structure as determined by wave action, the wave-responsive means further including at least one non-buoyant downwardly depending flap mounted on the support structure for pivotal movement about a substantially horizontal axis disposed in use above the surface of the sea, the wave-responsive means further including at least one buoyant flap mounted on the support structure for pivotal movement about a substantially horizontal axis disposed in use adjacent the surface of the water so that the buoyant flap will in use float on the surface of the water.

2. The apparatus of claim 1, wherein the wave-responsive means further includes at least one flap mounted for pivotal movement about a substantially vertical axis.

* * * * *

UNITED STATES PATENT AND TRADEMARK OFFICE
CERTIFICATE OF CORRECTION

PATENT NO. : 4,340,821

DATED : July 20, 1982

INVENTOR(S) : David M. Slonim

It is certified that error appears in the above-identified patent and that said Letters Patent is hereby corrected as shown below:

The attached sheet containing Figures 6A, 6B, 7A and 7B, should be included as part of the Letters Patent.

Signed and Sealed this

Twenty-sixth Day of October 1982

[SEAL]

Attest:

Attesting Officer

GERALD J. MOSSINGHOFF

Commissioner of Patents and Trademarks